United States Patent [19]

Goeldner

[11] Patent Number: 4,547,294
[45] Date of Patent: * Oct. 15, 1985

[54] ALKALINE SCALE ABATEMENT IN COOLING TOWERS

[75] Inventor: Richard W. Goeldner, Freeport, Fla.

[73] Assignee: Mechanical Equipment Company, Inc., New Orleans, La.

[*] Notice: The portion of the term of this patent subsequent to Apr. 24, 2001 has been disclaimed.

[21] Appl. No.: 572,227

[22] Filed: Jan. 19, 1984

Related U.S. Application Data

[63] Continuation-in-part of Ser. No. 350,004, Feb. 18, 1982, Pat. No. 4,444,675, which is a continuation-in-part of Ser. No. 283,939, Jul. 16, 1981, abandoned.

[51] Int. Cl.$^4$ ............................................. C02F 5/08
[52] U.S. Cl. .................................. 210/697; 210/698; 210/699; 210/700; 210/701; 252/181; 422/14
[58] Field of Search ............... 203/7; 210/696–701; 252/175, 180, 181; 422/12–14, 15–18

[56] References Cited

U.S. PATENT DOCUMENTS

| | | | |
|---|---|---|---|
| 2,182,286 | 12/1939 | Doennecke et al. | 210/696 |
| 3,218,241 | 11/1965 | Checkovich | 203/7 |
| 3,420,775 | 1/1969 | Cadwallader | 203/7 |
| 3,607,666 | 9/1971 | Roller | 203/7 |
| 4,188,291 | 2/1980 | Anderson | 203/7 |
| 4,204,953 | 5/1980 | Hodgson et al. | 210/700 |
| 4,209,398 | 6/1980 | Ii et al. | 422/17 |
| 4,255,259 | 3/1981 | Hwa et al. | 210/699 |
| 4,444,675 | 4/1984 | Goeldner | 252/175 |
| 4,472,283 | 9/1984 | Brooks | 210/698 |

FOREIGN PATENT DOCUMENTS

| | | | |
|---|---|---|---|
| 2030430 | 12/1971 | Fed. Rep. of Germany | 210/696 |
| 400177 | 10/1977 | U.S.S.R. | 210/696 |

OTHER PUBLICATIONS

"Cardox® Carbon Dioxide for pH Control", brochure–undated.

Betz Handbook of Industrial Water Conditioning, Chapter 14–"Recarbonation" (1945), Chapter 13–"Recarbonation" (1953).

Ellis et al., "Alkaline Scale Abatement by Carbon Dioxide Injection", *Environmental Science & Technology*, vol. 5, No. 4 at 350 (1971).

"The Effect of Plant Operating Conditions on Recirculating Brine pH, and the Effect of Brine pH on the Activity of Scale Control Additives"–Finan et al., Ciba-Geigy (UK) Ltd. (1978)–Circular DB 6.7.

Kunz et al., "Cooling Water Calculations", *Chemical Engineering*, Aug. 1, 1977, pp. 61–71.

*Primary Examiner*—Peter Hruskoci
*Attorney, Agent, or Firm*—Wood, Dalton, Phillips, Mason & Rowe

[57] ABSTRACT

Formation of alkaline scale on cooling tower and associated heat transfer surfaces contacted by circulating water is reduced or substantially eliminated while minimizing equipment corrosion by introducing an effective amount of carbon dioxide and a threshold effect chemical scale control additive to the circulating water.

10 Claims, No Drawings

ALKALINE SCALE ABATEMENT IN COOLING TOWERS

CROSS-REFERENCE TO RELATED APPLICATIONS

This is a continuation-in-part of copending, commonly assigned application Ser. No. 350,004 filed Feb. 18, 1982, now U.S. Pat. No. 4,444,675 issued Apr. 24, 1984, the disclosure of which is hereby incorporated by reference, which in turn is a continuation-in-part of application Ser. No. 283,939 filed Jul. 16, 1981, now abandoned.

BACKGROUND OF THE INVENTION

1. Field of the Invention

This invention relates generally to scale abatement and, more particularly, this invention relates to a method of reducing or substantially eliminating the rate and extent of formation of alkaline scale on cooling tower surfaces and other heat transfer surfaces which are contacted by circulating water cooled in cooling towers.

2. Brief Description of the Prior Art

Much research has been directed to the elimination or reduction of alkaline scale formation during evaporative processes operating on water which contains dissolved salts of magnesium and/or calcium. For example, in all types of sea water distillation equipment, heating of sea water to a temperature up to about 180° F. produces scale which is predominately calcium carbonate ($CaCO_3$). At temperatures above about 200° F., magnesium hydroxide [$Mg(OH)_2$] scale predominates. At temperatures between about 180° F. and 200° F. either type of scale, or mixtures thereof, may be encountered. Calcium carbonate and magnesium hydroxide scales are collectively referred to as alkaline scales.

Alkaline scale formation on surfaces of cooling towers and on heat exchange equipment contacted by cooling tower water has, similarly, long been a major problem. Since scale is a heat insulator, formation of alkaline scale tends to inhibit heat transfer from the apparatus being cooled by the circulating water stream. Accumulation of scale on wetted cooling tower surfaces (which are provided to achieve evaporative cooling through intimate contact with a moving air stream) interfere with efficient operation of cooling towers. Scale accumulation may result in shut downs, the cost of which is substantial, as is the direct cost of cleaning scaled surfaces.

For many years, a common means of controlling alkaline scaling in cooling towers has been to destroy bicarbonates and carbonates present in the water by adding an acid, such as a mineral acid, preferably sulfuric acid. Sulfuric acid has commonly been used because of its effectiveness and because it is usually the most economical source of hydrogen ions to produce the required chemical reactions.

Cooling towers using acid as a means of controlling alkaline scale formation normally operate at a pH of about 6–7. Such an acidic pH range is corrosive to iron and copper alloy surfaces contacted by the cooling water. In order to inhibit corrosion of these metals it has become common practice to add chromates and polyphosphates, either singly or in combination, and often with a source of metal ions such as zinc.

Recently, however, it has been recognized that these corrosion inhibiting chemicals, which are present in the cooling tower blowdown stream, present an environmental pollution problem. Since non-polluting corrosion inhibitors have not yet been found which are effective under the acidic operating conditions utilized in some cooling towers, operation of cooling towers in alkaline pH ranges has been attempted. At alkaline pH levels, corrosion rates can be controlled using available chemicals at dosage levels which have resulted in relatively low levels of pollution. However, operation under alkaline conditions requires scale inhibitors which are effective under alkaline pH conditions, because such conditions favor the precipitation of calcium carbonate and, if magnesium is present in the water, magnesium hydroxide.

Pollution and water supply conservation concerns have been an incentive to operate cooling towers at relatively high dissolved salt concentrations in order to minimize the volume of the cooling tower blowdown stream which must be disposed of, and to minimize the volume of makeup water needed which in many cases is pretreated prior to its introduction into the cooling tower system. Operation at high salt concentrations, however, results in higher pH levels and hardness concentrations so that, in many cases, sulfuric acid is added to reduce the pH and the total alkalinity of the cooling tower water in order to reduce the severity of the chemical conditions existing, thus enhancing of the effectiveness of alkaline scale inhibitors.

However, the use of sulfuric acid as noted above presents a secondary scale problem which is a result of the limited solubility of calcium sulfate. Since most water supplies contain significant concentrations of calcium and since sulfate ions are introduced to cooling tower water by the addition of sulfuric acid, care must be taken to withdraw enough cooling tower blowdown to avoid supersaturation and deposition of one or more of the various crystalline forms of calcium sulfate. In some cases, threshold type chemical additives are employed to permit operation of cooling towers under conditions in which calcium sulfate scales would otherwise occur.

To date, none of the means of controlling alkaline scale formation summarized above have been totally satisfactory, as such approaches generally result in high corrosion rates or high dosing rates of threshold effect scale control additives, among other problems.

SUMMARY OF THE INVENTION

It is an object of the invention to overcome one or more of the problems described above.

According to the present invention, alkaline scale formation on water contact surfaces of cooling towers is eliminated or substantially reduced by dissolving in the water at least one chemical scale control additive which effects threshold alkaline scale inhibition, and introducing an amount of carbon dioxide sufficient to substantially reduce the carbonate ion concentration yet insufficient to result in excessive amounts of chemically uncombined carbon dioxide in the water.

As a result, the pH range of the cooling tower water is maintained at a sufficiently high level to minimize corrosion, yet chemical conditions which favor effective application of threshold chemical treatment are maintained.

Further objects and advantages of the invention will be apparent to those skilled in the art from the following detailed description taken in conjunction with the appended claims.

DETAILED DESCRIPTION OF THE INVENTION

According to the present invention, alkaline scale formation on water contact surfaces of cooling towers is reduced or substantially eliminated by dissolving in the cooling tower water at least one chemical scale control additive which effects threshold alkaline scale inhibition and introducing an effective amount of carbon dioxide. The carbon dioxide is introduced in an amount sufficient to substantially reduce the carbonate ion concentration of the water yet insufficient to result in excessive amounts of chemically uncombined carbon dioxide in the water.

According to the inventive method, the pH of the water is maintained at about 7.5 or above as measured at room temperature, and the concentration of chemically uncombined carbon dioxide in the water is maintained at or below about 30 ppm, preferably between 7 and 30 ppm.

Such treatment does not reduce the total alkalinity of the cooling tower waters, but effectively reduces the hydroxyl ion and carbonate ion concentrations of the water from those existing when the chemical additive is used alone and, thus, substantially eliminates scaling by significantly reducing conversion of bicarbonate ion to carbonate ion and to hydroxyl ion.

According to the invention, the introduction of carbon dioxide in cooling tower water replaces carbon dioxide which is lost from the water as a result of the evaporative cooling process and thus reduces the increase of carbonate ion and hydroxyl ion concentrations by inhibiting decomposition of bicarbonate ion to such an extent that the presence of the chemical scale control additive substantially completely eliminates formation of calcium carbonate and, if magnesium is present, magnesium hydroxide scales.

As a result, presently commercially available chemical scale control additives are rendered substantially more effective in eliminating alkaline scale formation.

This synergistic result is obtained without a significant increase in corrosion rate, since the total alkalinity of the cooling tower water is not reduced, and the reduction in the water pH is not sufficient to significantly increase the corrosion rates of materials of construction commonly used in cooling towers and other apparatus cooled by the water circulated through such cooling towers.

The introduction of carbon dioxide into the cooling tower may be accomplished by any of various means, including the following:

1. Introduction of carbon dioxide as a gas, liquid or solid directly into the cooling tower water;
2. Mixing of carbon dioxide with a side stream of water which is then mixed with the cooling tower water;
3. Introduction of flue gas from a combustion process into the cooling tower water; and,
4. Introduction of flue gas from a combustion process into the air stream brought into intimate contact with the cooling tower water during the process of cooling the water.

In many areas of the world cooling towers have been used in connection with steam turbine power plants in order to reject heat transferred to the water which cools the main condensers. Because of the need to remove carbon, ash and oxides of sulfur from the flue gases resulting from the combustion processes in these power plants, gas scrubbers are often used to purify such waste gas streams. The resulting gas streams are primarily composed of nitrogen, oxygen, carbon dioxide and water vapor. The carbon dioxide content of such a stream is often 10% or more by volume and may be used advantageously to supply the carbon dioxide needed to treat the cooling water according to the present invention.

Although it has long been recognized that alkaline scaling can be inhibited by the injection of carbon dioxide, control of alkaline scaling in cooling towers by such means alone has not been applied commercially because the pH values are too low and the concentrations of "free" (chemically uncombined) carbon dioxide are too high to avoid corrosive conditions. Additionally, because of the relatively high concentrations of free carbon dioxide and the rate of carbon dioxide loss from the cooling tower water to the atmosphere during the evaporative cooling process, very great quantities of carbon dioxide would be required to maintain proper operating conditions. It is only in combination with effective threshold chemical scale control additives that chemical conditions can be maintained which are both alkaline so as to avoid high corrosion rates, and low enough in free carbon dioxide to make the introduction of carbon dioxide as a scale inhibitor practical.

The presence of dissolved carbon dioxide in the water of the cooling tower inhibits the decomposition of bicarbonate ions. In effect, the carbonate ions and hydroxyl ions act as a "sponge" with respect to the carbon dioxide to reduce loss thereof in the free form. Thus, the tendency for any magnesium and calcium which may be present to precipitate as magnesium hydroxide and calcium carbonate is reduced. Further, the presence of the threshold chemical scale control additive interferes with scale precipitation, generally by enhancing the stability over prolonged periods of time of waters supersaturated with respect to magnesium hydroxide and calcium carbonate, thus substantially preventing or minimizing formation of these alkaline scales.

True synergism between the effects of the threshold chemical addition and the carbon dioxide addition is attained since the presence of the chemical alone reduces scale formation only to a limited degree, which may be insufficient in many installations and treatment with carbon dioxide alone to the extent necessary to control alkaline scale formation drastically lowers the water pH and increases the free carbon dioxide concentration, resulting in intolerable corrosion rates.

According to this invention, a high proportion (e.g. above about 70–75%) of the reduction of alkaline scaling rate is accomplished by the chemical scale control additive, but carbon dioxide addition in combination with the chemical effects substantial elimination of scale formation.

In the practice of this invention in connection with cooling towers, the pH of the cooling tower water is maintained at or greater than about 7.5, by addition of the threshold effect chemical scale control additive in combination with carbon dioxide. The concentration of free carbon dioxide is preferably maintained at between about 7 and 30 ppm.

The selection of pH and free carbon dioxide levels within the recited ranges will depend upon operating variables such as the type of cooling tower, materials of construction, operating temperature, degree of concentration of water, the chemical analysis of the makeup water, etc.

As noted above, the invention resides in the introduction to cooling tower water of carbon dioxide in combination with one or more selected chemical scale control additives which provide a threshold scale inhibiting effect by elevating the concentration of carbonate ions and hydroxyl ions in solution in the presence of calcium and magnesium ions. Chemicals with only wetting and sequestering properties are not suitable.

It is believed that inhibition of scaling according to the invention is a result, at least in part, of modification of the surface of scale crystals by the chemical additive as scale is in the process of forming, whereby the rate of crystallization is reduced. Microscopic studies have revealed substantial crystal distortion when threshold effect chemical scale control compounds are present.

A variety of suitable additives are commercially available, and include polymers and copolymers of maleic acid, polyphosphonates, phosphonic acid derivatives, aminophosphonic acid derivatives, polyacrylic and polymethacrylic acid derivatives, polyolesters and polyphosphates.

Mineral acids may be used with this invention to reduce the alkalinity present and thereby complement the performance of the inventive method. However, in some cases, the application of the invention may permit a reduction in the use of mineral acids which might otherwise be used to reduce pH and alkalinity levels.

Other suitable chemical treating agents include certain compounds of the type marketed by Monsanto Company under the trademark DEQUEST and those marketed by American Cyanamid Company under the trade designation P70 (a polyacrylate).

Those skilled in the art will recognize that the performance of various suitable chemical additives will vary; however, the method of the present invention will improve the performance of all polymers of the type described above.

The dosing rates of chemical scale control additives identified above can readily be empirically determined, and it has been established that dosing rates lower than the rates recommended by the respective manufacturers of the additives provide acceptable results when used in combination with added carbon dioxide according to the method of this invention.

Such threshold effect scale inhibiting chemical additives are often applied under conditions where the scaling tendency of cooling tower water is great enough to have a Langelier Saturation Index (LSI) of +1.5.

The Langelier Saturation Index is an indicator of calcium carbonate stability, and is defined as follows:

$$LSI = pH - pH_s$$

where $pH_s$ is the pH at which water having a given calcium and alkalinity level is saturated with respect to calcium carbonate. As the LSI increases to values greater than 0 the water is generally considered to have an increasing scaling tendency. This index is defined in Langelier, W. F., *JAWWA*, Vol. 28 (1936) pages 1500-1521, the disclosure which is hereby incorporated herein by reference.

EXAMPLES

The following detailed Examples are intended to illustrate the practice of the present invention, but the scope of the invention is not to be considered to be limited thereby.

EXAMPLES 1-4

The following Table I represents examples of chemical conditions under which the method of the invention is useful in controlling alkaline scaling in cooling tower waters. It should be noted that pH values are in the alkaline range although lower than that which would have occurred had addition of carbon dioxide not been effected along with the addition of threshold type scale inhibitors. It will also be noted that concentrations of free carbon dioxide are generally in the range of 7-30 ppm.

TABLE I

| Example Number | 1 | 2 | 3 | 4 |
| --- | --- | --- | --- | --- |
| Temperature (°F.) | 100 | 100 | 100 | 100 |
| Langelier Saturation Index | +1.5 | +1.5 | +1.5 | +1.5 |
| Total Dissolved Solids (ppm) | 4000 | 4000 | 4000 | 4000 |
| Calcium Hardness (ppm $CaCO_3$) | 1000 | 1500 | 2000 | 500 |
| Total Alkalinity (ppm $CaCO_3$) | 480 | 320 | 240 | 308 |
| pH | 7.5 | 7.5 | 7.5 | 8.0 |
| Approximate Free $CO_2$ (ppm) | 30 | 22 | 15 | 7 |

EXAMPLE 5

The following Table II illustrates various characteristics of a particular makeup water before and after two and three cycles of concentration. (The term "cycles" or "cycles of concentration" as used herein refers to the factor by which the initial solids concentration of the makeup water is increased as a result of evaporation in the cooling process. Thus, a reduction in makeup water volume of 60% as a result of evaporation represents an increase in solids concentration of the resultant water to 2.5 times that present in the makeup water and the cooling tower is said to be operating at 2.5 cycles of concentration.) The LSI, pH and free $CO_2$ levels at two cycles of concentration, with treatment by a threshold effect scale inhibitor alone and, those values at three cycles with inhibitor alone and with the combination of inhibitor and carbon dioxide, are shown.

In discussing a similar feed water, Kunz et al., in "Cooling water calculations" *Chemical Engineering* Aug. 1, 1977, pages 61-71 indicate that concentration of a water such as that of Table II should be limited to two cycles because of scaling, based on a maximum desired LSI of about +1.6. If the water is concentrated three-fold without carbon dioxide injection, the LSI increases to about +2.2. However, if carbon dioxide is combined with the scale inhibitor at three cycles of concentration, the pH is reduced from about 8.6 to about 8.0 and the LSI is maintained at about the same value as it was at two cycles when using the chemical scale inhibitor alone.

TABLE II

| | Makeup Water No Treatment | @ 2 Cycles Inhibitor Only | @ 3 Cycles Inhibitor Only | @ 3 Cycles Inhibitor +$CO_2$ |
| --- | --- | --- | --- | --- |
| Total Dissolved Solids* | 2000 | 4000 | 6000 | 6000 |
| Alkalinity | 147 | 294 | 441 | 441 |
| Ca* | 147 | 294 | 441 | 441 |
| Mg* | 99 | 198 | 297 | 297 |
| pH | 8.0 | 8.3 | 8.6 | 8.01 |
| $pH_s$ | | 6.72 | 6.43 | 6.43 |

TABLE II-continued

|  | Makeup Water No Treatment | @ 2 Cycles Inhibitor Only | @ 3 Cycles Inhibitor Only | @ 3 Cycles Inhibitor +CO₂ |
|---|---|---|---|---|
| LSI |  | +1.58 | +2.17 | +1.58 |
| Free CO₂ (ppm) (Estimated) |  | 3.0 | 2.2 | 8.8 |

*(mg/L as equivalent CaCO₃)

It will be appreciated by those skilled in the art that the method described above allows cooling tower operation at increased salt concentrations to be performed while maintaining low rates of alkaline scale formation with no substantial increase in corrosion characteristics.

The desired pH and free CO₂ ranges set forth herein are desirable with the presently commercially available chemical additives identified herein. Should chemicals capable of inhibiting alkaline scale formation at higher pH levels be developed in the future, it is contemplated that the objects of the invention will be obtainable with such chemicals by the means taught herein, i.e. by reducing the pH of water treated by such chemicals by addition of carbon dioxide. Thereby, the alkaline scale inhibiting characteristics of such chemicals will be enhanced.

The foregoing detailed description is given for clearness of understanding only and no unnecessary limitations should be understood therefrom, as modifications will be obvious to those skilled in the art.

I claim:

1. A method of reducing or substantially eliminating alkaline scale formation on cooling tower and heat transfer surfaces which are contacted by circulating water of a cooling tower, which water would normally contain a substantial concentration of carbonate and hydroxyl ions formed by decomposition of bicarbonate ions present in said water, said method comprising the steps of introducing in said circulating water:
   (a) an effective amount of at least one chemical scale control additive which effects threshold alkaline scale inhibition in cooling tower water having a Langelier Saturation Index of up to +1.5; and,
   (b) an amount of carbon dioxide sufficient to substantially reduce the decomposition of said bicarbonate ions to carbonate and hydroxyl ions in said water yet insufficient to result in excessive amounts of chemically uncombined carbon dioxide in said water, such that the pH of said water is maintained at about 7.5 or above as measured at room temperature, and the concentration of chemically uncombined carbon dioxide in said water is maintained at or below about 30 ppm, whereby corrosive conditions and alkaline scale formation are avoided.

2. The method of claim 1 wherein said scale control additive is chosen from the group consisting of polymers and copolymers of maleic acid, polyphosphonates, phosphonic acid derivatives, aminophosphonic acid derivatives, polymethacrylic and polyacrylic acid derivatives, polyolesters, polyphosphates or mixtures thereof.

3. The method of claim 1 wherein said chemically uncombined carbon dioxide concentration is maintained at between about 7 and 30 ppm, inclusive.

4. The method of claim 1 wherein said carbon dioxide is obtained from a source external to said cooling tower.

5. The method of claim 4 wherein said source is a combustion process.

6. The method of claim 5 wherein said carbon dioxide is supplied to said circulating water by introducing flue gas from said combustion process into an air stream brought into intimate contact with said cooling water.

7. The method of claim 1 wherein said carbon dioxide is supplied to said circulating water by injection and mixing of gaseous carbon dioxide directly into said water.

8. The method of claim 1 wherein said carbon dioxide is supplied to said circulating water by dissolving said carbon dioxide in a relatively cool water stream, and mixing said stream with said circulating water.

9. A method of reducing or substantially eliminating alkaline scale formation on surfaces which are contacted by circulating water of a cooling tower, which water would normally contain a substantial amount of carbonate ions formed by decomposition of bicarbonate ions present in said water, said method comprising the steps of introducing in said water:
   (a) an effective amount of at least one threshold effect chemical scale control additive selected from the group consisting of polymers and copolymers of maleic acid, polyphosphonates, phosphonic acid derivatives, aminophosphonic acid derivatives, polymethacrylic and polyacrylic acid derivatives, polyolesters, polyphosphates or mixtures thereof; and,
   (b) an effective amount of carbon dioxide sufficient to substantially reduce the decomposition of said bicarbonate ions to carbonate and hydroxyl ions in said water and such that the pH of said water is maintained at about 7.5 or above as measured at room temperature, and the concentration of chemically uncombined carbon dioxide in said water is less than about 30 ppm.

10. The method of claim 9 wherein the concentration of free carbon dioxide in said water is maintained at between about 7 and 30 ppm, inclusive.

* * * * *